(No Model.)
M. NITTLE.
NUT LOCK.
No. 577,517. Patented Feb. 23, 1897.
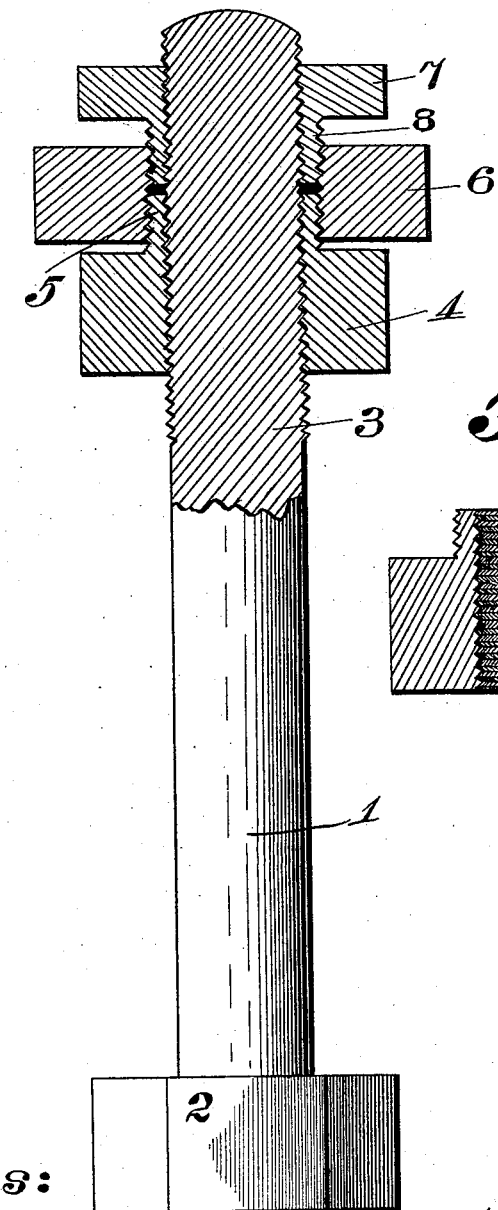
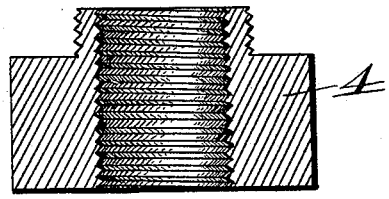
Witnesses:
Macaulay Hunter
W J McCaskey
Inventor:
Michael Nittle
By O D Levis
Atty.

UNITED STATES PATENT OFFICE.

MICHAL NITTLE, OF PITTSBURG, PENNSYLVANIA.

NUT-LOCK.

SPECIFICATION forming part of Letters Patent No. 577,517, dated February 23, 1897.

Application filed December 27, 1895. Serial No. 573,459. (No model.)

*To all whom it may concern:*

Be it known that I, MICHAL NITTLE, a citizen of the United States, residing at Pittsburg, in the county of Allegheny and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in nut-locks, and has for its object the provision of new and novel means whereby a nut-lock may be constructed that can be used on any ordinary bolt and that will add to the appearance of the bolt when it is placed in position.

A further object of the invention is to provide a nut-lock that will effectually lock the nut carried by the bolt and thereby prevent the same from becoming loose or lost from the bolt.

A still further object of the invention is to provide a nut-lock that will be simple in construction, strong, durable, effectual in operation, and comparatively inexpensive to manufacture.

With the above and other objects in view the invention consists in the novel construction, combination, and arrangement of parts hereinafter more particularly described, and specifically pointed out in the claim.

In describing the invention in detail reference is had to the accompanying drawings, forming a part of this specification, and wherein like figures of reference indicate similar parts throughout both views, in which—

Figure 1 is a side view of a bolt with the thread portion, nut, and nut-lock shown in section. Fig. 2 is a cross-sectional view of a portion of the locking device.

In the drawings, 1 represents the bolt proper, and 2 the head of the same, which may be of any desired shape.

3 represents the threaded portion of the bolt 1, and 4 the nut on the same, said nut being provided with screw-threads to engage the threads on the bolt and is also provided with a flange 5 on the side toward the screw-threaded end of the bolt 1, said flange being screw-threaded both on the outside and inside, as shown in Fig. 1 of the drawings.

An auxiliary or supplemental nut 6 is provided adapted to engage or screw on the flange 5 of the nut 4 and to permit of the screwing thereinto of the flange 8 of the nut 7. The nut 7 is also provided with screw-threads adapted to engage the bolt 1, the inner face of the flange carrying threads for a similar purpose.

The mode of applying my improved nut-lock is as follows: The bolt is first placed in its proper position and the nut 4 is inserted on the same. The nut 6 is then screwed on the flange 5 of the nut 4 and the supplemental or auxiliary nut 7 screwed upon the bolt 3, its flange 8 being caused to engage or screw into the unengaged screw-threads of the nut 6. When this operation has been completed, it will be noted that the different parts will be securely locked in their respective positions, and the nut 4 will be securely retained in the position in which it was first placed on the bolt and cannot be removed therefrom until the outer nuts have been removed.

It will also be noted that various changes may be made in the details of construction of my improved nut-lock without departing from the general spirit of my invention.

Having fully described my invention, what I claim as new, and desire to secure by Letters Patent, is—

The nut-lock comprising the bolt, the nut screwed thereon and having an internally and externally threaded flange, the auxiliary nut also screwed on said bolt and having an internally and externally threaded flange, and a third nut screwed upon the flange of the first-named nut and adapted to permit the screwing thereinto of the flange of the second nut, substantially as set forth.

In testimony whereof I affix my signature in presence of two witnesses.

MICHAL NITTLE.

Witnesses:
ALBERT J. WALKER,
MACAULAY HUNTER.